United States Patent
Kato et al.

[11] Patent Number: 6,082,288
[45] Date of Patent: *Jul. 4, 2000

[54] INDICATING INSTRUMENT HAVING SELF-LUMINESCENT INDICATOR

[75] Inventors: Miki Kato; Yukinori Tamano, both of Kariya; Katsumi Kobayashi, Anjo; Michiyuki Noba, Toyota, all of Japan

[73] Assignee: Nippondenso Co., Ltd., Kariya, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/531,781

[22] Filed: Sep. 21, 1995

[30] Foreign Application Priority Data

Oct. 31, 1994 [JP] Japan ................................ 6-267650
Oct. 31, 1994 [JP] Japan ................................ 6-267714

[51] Int. Cl.⁷ ............................................. G01D 13/22
[52] U.S. Cl. ........................... 116/286; 116/DIG. 36; 116/288
[58] Field of Search .................. 116/62.1, 62.2, 116/62.3, 62.4, 286, 287, 288, DIG. 36; 368/223, 228

[56] References Cited

U.S. PATENT DOCUMENTS

| | | | |
|---|---|---|---|
| 4,640,561 | 2/1987 | George | 339/17 F |
| 5,050,045 | 9/1991 | Kato et al. | 362/23 |
| 5,211,128 | 5/1993 | Katoh et al. | 116/288 |
| 5,372,087 | 12/1994 | Kato et al. | 116/288 |

FOREIGN PATENT DOCUMENTS

| | | |
|---|---|---|
| 3837295 | 5/1990 | Germany . |
| 4093617 | 3/1992 | Japan ..... 116/288 |
| 5-173160 | 7/1993 | Japan . |
| 5-226802 | 9/1993 | Japan . |
| 5-79436 | 10/1993 | Japan . |
| 6-50776 | 2/1994 | Japan . |
| 6-109762 | 4/1994 | Japan . |
| 6-99562 | 4/1994 | Japan . |
| 6-176845 | 6/1994 | Japan . |
| 6-236886 | 8/1994 | Japan . |
| 7-286868 | 10/1995 | Japan . |

*Primary Examiner*—Hezron E. Williams
*Assistant Examiner*—Willie Morris Worth
*Attorney, Agent, or Firm*—Pillsbury Madison & Sutro LLP

[57] ABSTRACT

A pair of resilient clamps hold L-shaped terminals which extend from a self-luminescent indicator. An insulator disk holds a flexible conductive coil member and has slots which accommodate an end of the coil member and the resilient clamps in compressive state so that resilient force of the resilient clamps provide stable electric connection between the L-shaped terminals and the end of the coil member automatically when the clamp members are inserted into the slots. A pair of stationary catch members hold the other end of the coil member and connect it to an electric source. The connection between the other end of the coil member and the catch members is carried by hot punching to form thermo-compression bonding layer. The connecting portions of the catch members and the coil member are plated with tin or solder beforehand for this purpose.

9 Claims, 21 Drawing Sheets

FIG. 12A
FIG. 12B
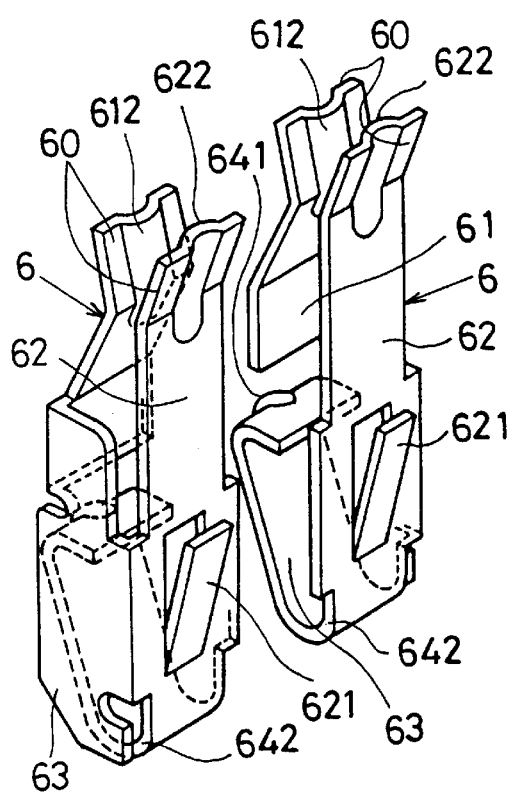
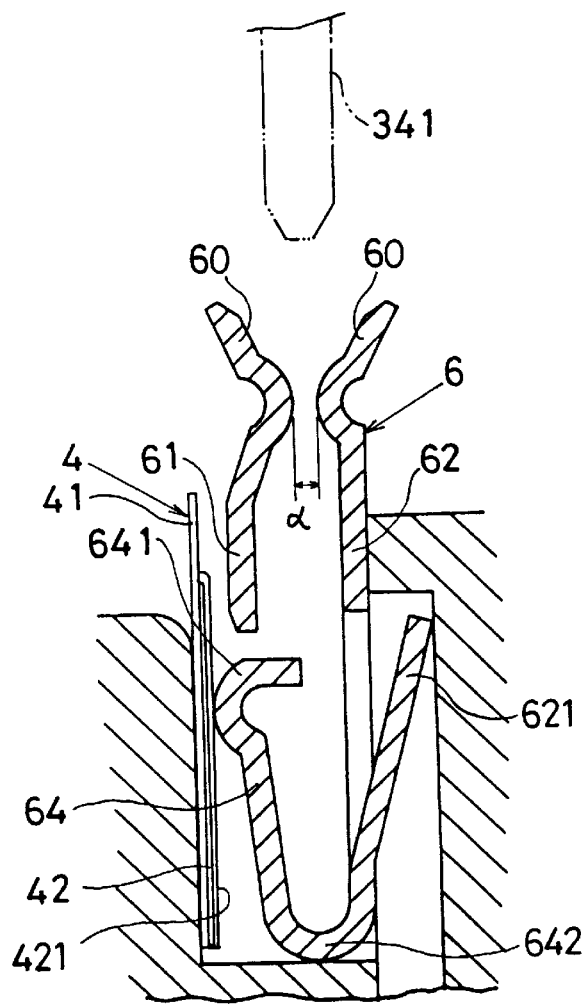

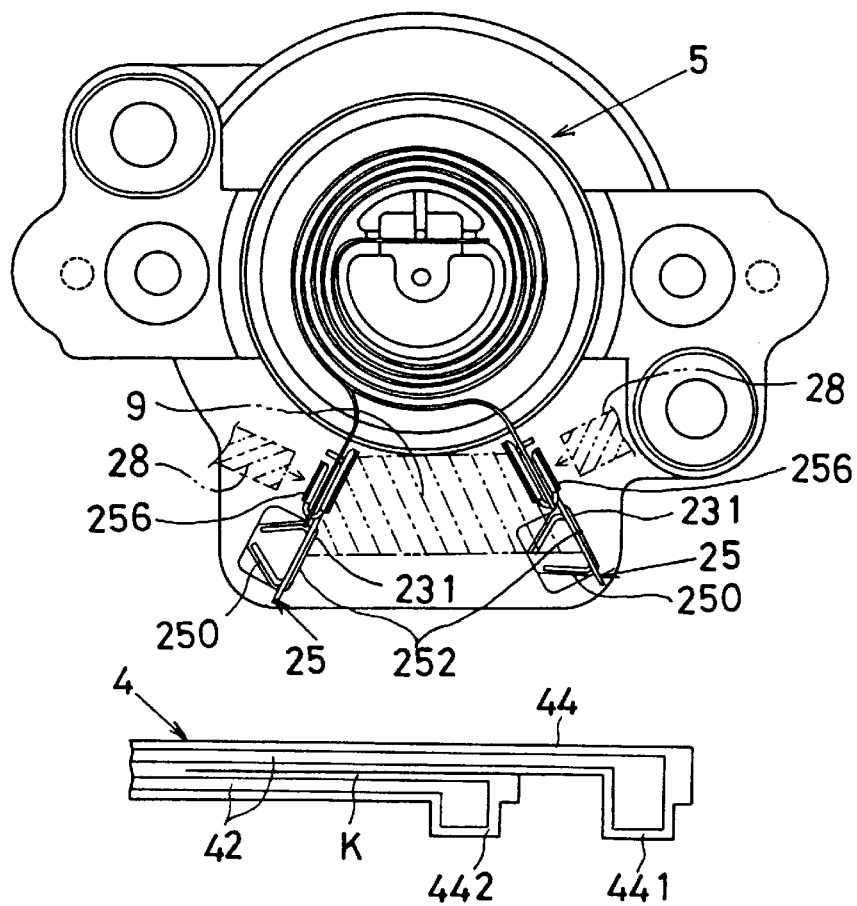
FIG. 17
FIG. 18
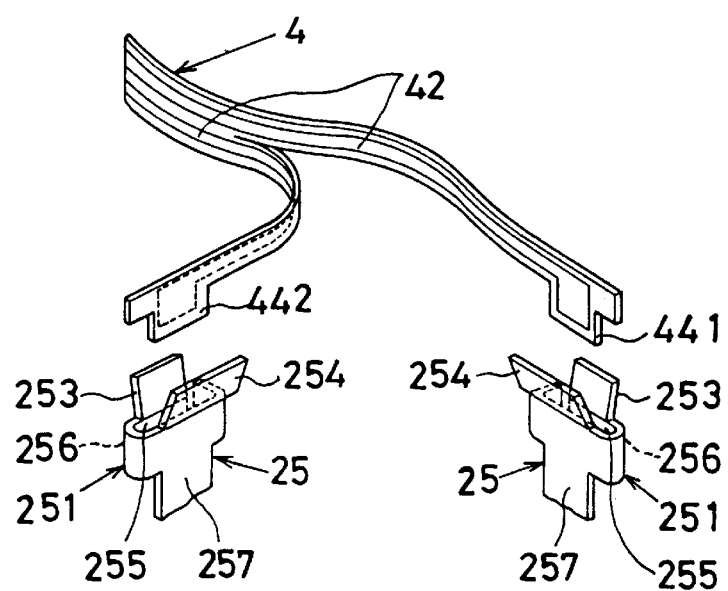
FIG. 19

INDICATING INSTRUMENT HAVING SELF-LUMINESCENT INDICATOR

CROSS REFERENCE TO RELATED APPLICATION

The present application is based on and claims priority from Japanese Patent Applications Hei 6-267650 filed on Oct. 31, 1994 and Hei 6-267714 filed on Oct. 31, 1994, the contents of which are incorporated herein by reference.

BACKGROUND OF THE INVENTION

1. Field of the Invention

The present invention relates to an indicating instrument having a self-luminescent indicator for a vehicle.

2. Description of the Related Art

An indicating instrument having a self-luminescent indicator which utilizes a flexible printed circuit board (hereinafter referred to as FPC) is disclosed in U.S. Pat. No. 5,372,087 (corresponding to Japanese Unexamined Patent Publication Hei 6-66601 filed by the same assignee).

The FPC used in the above indicating instrument has a straight portion carrying light emitting diodes (hereinafter referred to as LED) and a coil portion. When it is assembled, the coil portion is temporarily wound around a boss portion of an indicator (pointer), and an optical lens is fitted on the pointer. A cover is secured on the lens, and a rotary shaft of a movement is fitted to the boss portion. The FPC is removed from the boss portion and connected to a terminal of the movement so that it is retained in the movement at a designated interval.

However, the FPC has to be removed and connected to a terminal of the movement in a narrow space between the dial plate and the movement, increasing assembling time.

Another indicating instrument is disclosed in U.S. Pat. No. 5,050,045 (corresponding to Japanese Unexamined Patent Publication Hei 277718 filed by the same assignee).

However, when a dial plate and a movement including a decoration plate 901 and a pointer 903 are assembled, it is necessary to pass the pointer 903 and the decoration plate 901 through an opening 902 of the dial plate as shown in FIG. 27.

SUMMARY OF THE INVENTION

The present invention is made in view of the foregoing problems, and has a primary object of providing an improved indicating instrument having a self-luminescent indicator which is easier to assemble with decreased number of parts.

Another object of the present invention is to provide an indicating instrument having a separate self-luminescent indicator which is fixed easily when a dial plate and a movement are assembled.

A further object of the present invention is to provide an indicating instrument having a self-luminescent indicator which includes a pair of resilient conductive claws grasping an electric terminal of the indicator therein, and a fixture member having a space for accommodating an end portion of a coiled FPC and the resilient claws in a compressive and contact state so that resilient force of the resilient claws increases and stable electric connection between the electric terminal of the indicator and FPC is obtained.

A still further object of the present invention is to provide an indicating instrument having a self-luminescent indicator in which the electric lead of the coiled FPC and a terminal of a movement are plated with tin or solder and connected by hot punching, forming thermo-compressive bonding.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

FIG. 12A is a perspective view illustrating a pair of metal terminals of the indicating instrument according to a second embodiment of the present invention, and FIG. 12B is a sectional-side view illustrating one of the same terminals when fixed to an insulator;

FIG. 17 is a plan view illustrating a main part of an indicating instrument according to a sixth embodiment;

FIG. 18 is a front view illustrating an outer end portion of the FPC of the indicating instrument according to the sixth embodiment;

FIG. 19 is a perspective view illustrating the end portion of the FPC and a portion of the fixer terminals according to the sixth embodiment;

DETAILED DESCRIPTION OF THE PREFERRED EMBODIMENT

Preferred embodiments of the present invention will be described with reference to the appended drawings next.

An indicating instrument according to a first embodiment of the present invention will be described with reference to FIGS. 1 through 8.

Figure 1:
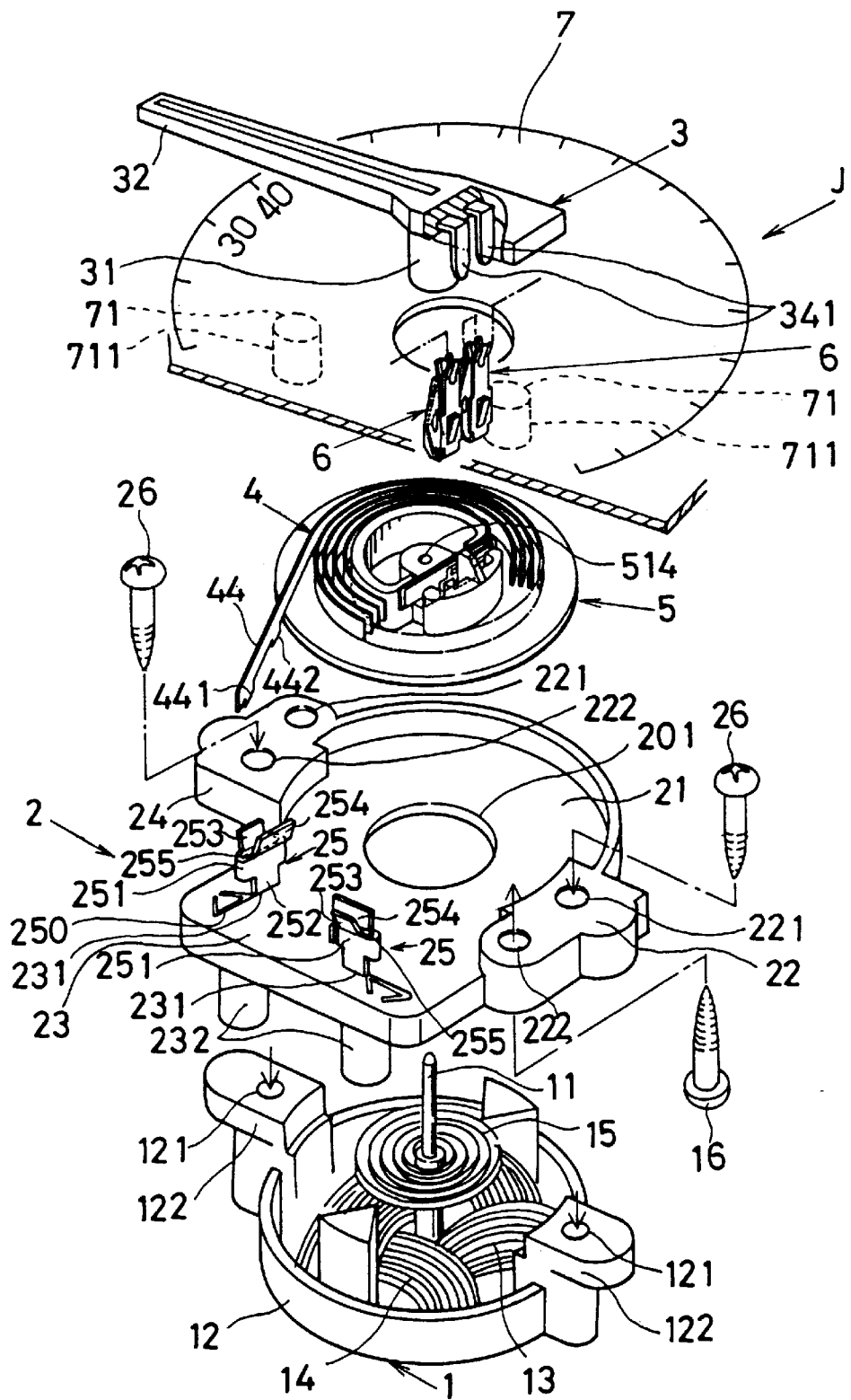
FIG. 1 is an exploded view illustrating an indicating instrument according to a first embodiment of the present invention.

In FIG. 1, a speedometer J is composed of a movement 1 which has a rotary shaft 11, a fixer plate subassembly 2 which is secured to the movement 1 by a bolt, a coiled circuit member or strip of flexible printed circuit (hereinafter referred to as FPC) 4 which is wound around the shaft 11, an insulator member 5 which is carried by the shaft to rotate therewith, metal U-shaped terminals 6 and a dial plate 7, and is disposed in a front instrument panel (not shown) of a vehicle.

The movement 1 is a cross-coil type and is composed of a housing 12, a drive coil 13, a control coil 14, and a hair spring 15. The drive coil 13 and the control coil 14 are energized by a driving circuit (not shown) to exert rotating torque on the shaft 11.

The shaft 11 stands still where the rotating torque balances with the composite spring force of the hair spring 15 and the FPC 4.

The housing 12 is made of plastic or the like and is provided with fixer plate holders 122 having screw holes 121.

The fixer plate subassembly 2 is made of hard and heat resistive resinous material such as PBT, and provided with a shallow cylindrical portion 21 whose diameter is slightly greater than the diameter of the insulator 5, two movement support members 22, a terminal portion 23 and fixer terminals 25 secured to the terminal portion 23.

The cylindrical portion 21 has an opening 201 at its center, which receives the hair spring 15.

The movement support members 22, which are thicker than the terminal portion 23, have through holes 221 and are disposed on opposite sides of the outer periphery of the cylindrical portion 21. The terminal portion 23 has grooves 231 and columnar supports 232 for securing fixer terminals 25, and is also disposed on a periphery of the cylindrical portion between both support members 22.

Each of the fixer terminals 25 has a catch or fixer terminal member 251 which holds an end 44 of the FPC 4, a prop 252 which is held in the groove and a generally triangular pillar 250. The fixer terminal 25 is made of phosphor bronze and is plated with copper as substratum metal which is plated with tin or solder (an alloy of tin) thereafter.

The tin plating protects the copper surface from being oxidized (non conductive) and expedites formation of diffused layer during the thermo-compression bonding. The triangular pillar 250 receives a pin (not shown) which is soldered to an insulated lead wire and connected to an indicator illuminating circuit (not shown).

Figure 5:
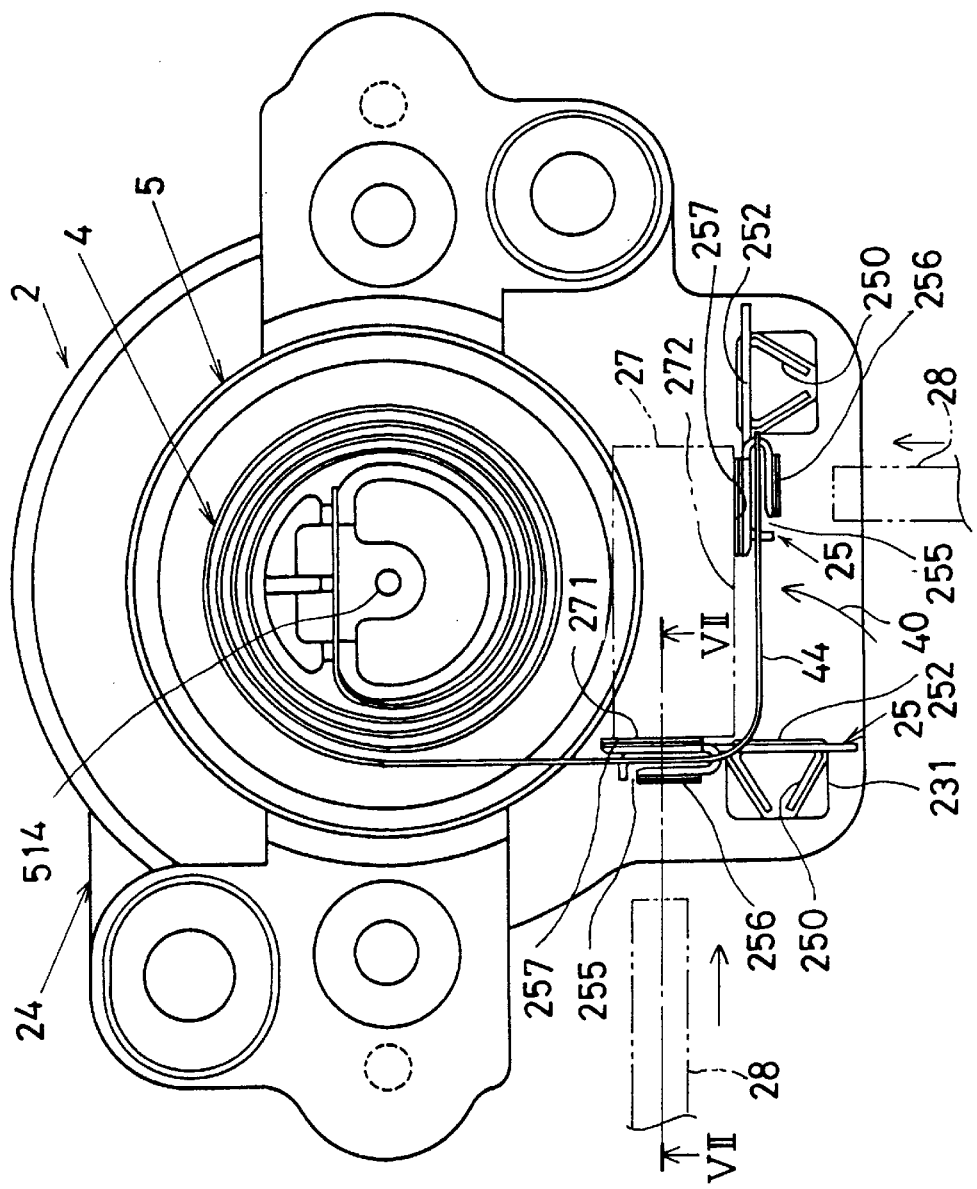
FIG. 5 is an enlarged plan view illustrating a main part of the indicating instrument according to the first embodiment before a coiled FPC is bonded.
Figure 6:
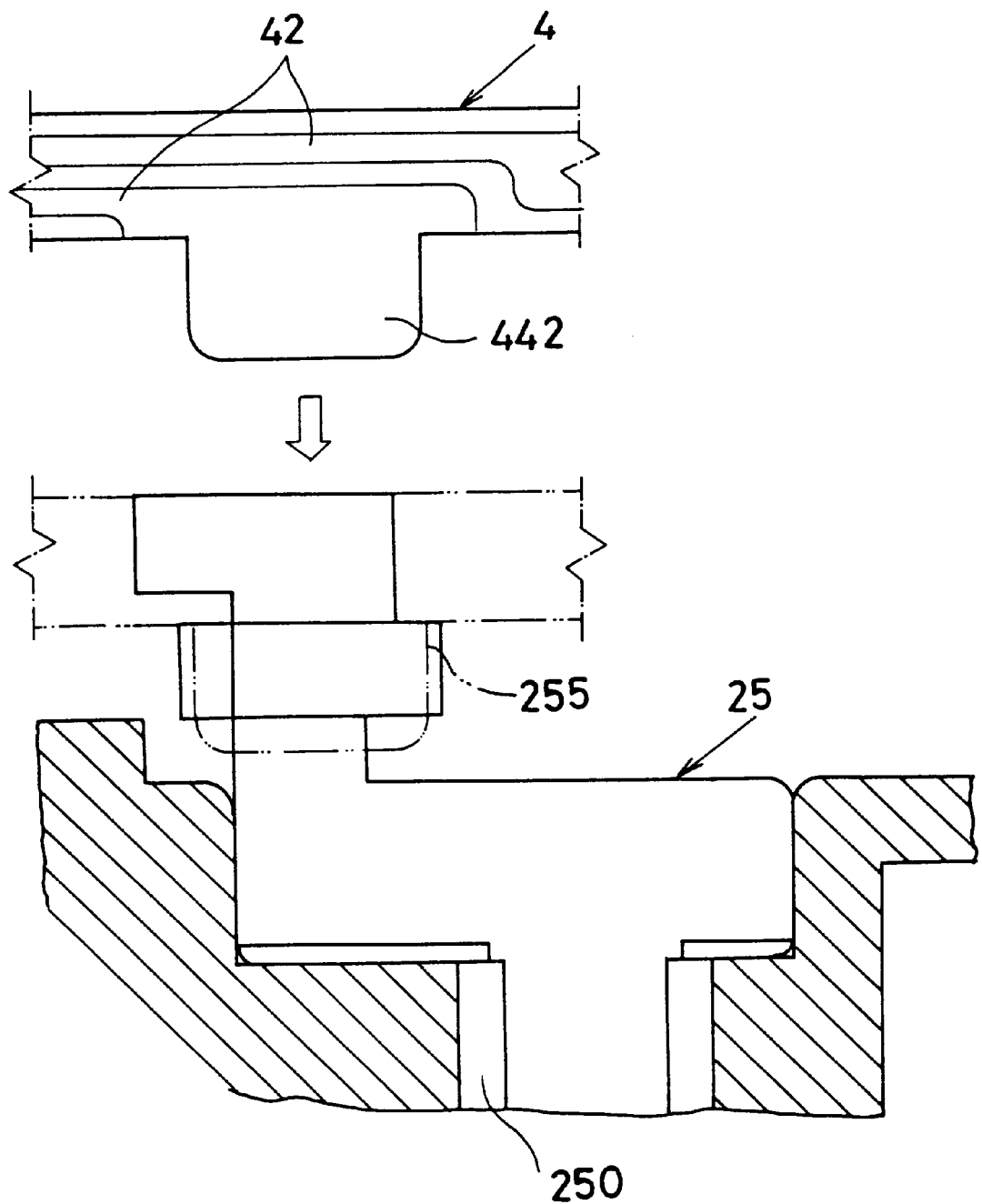
FIG. 6 is a schematic side view illustrating an outer end of the FPC and a fixer terminal before assembled.
Figure 7:
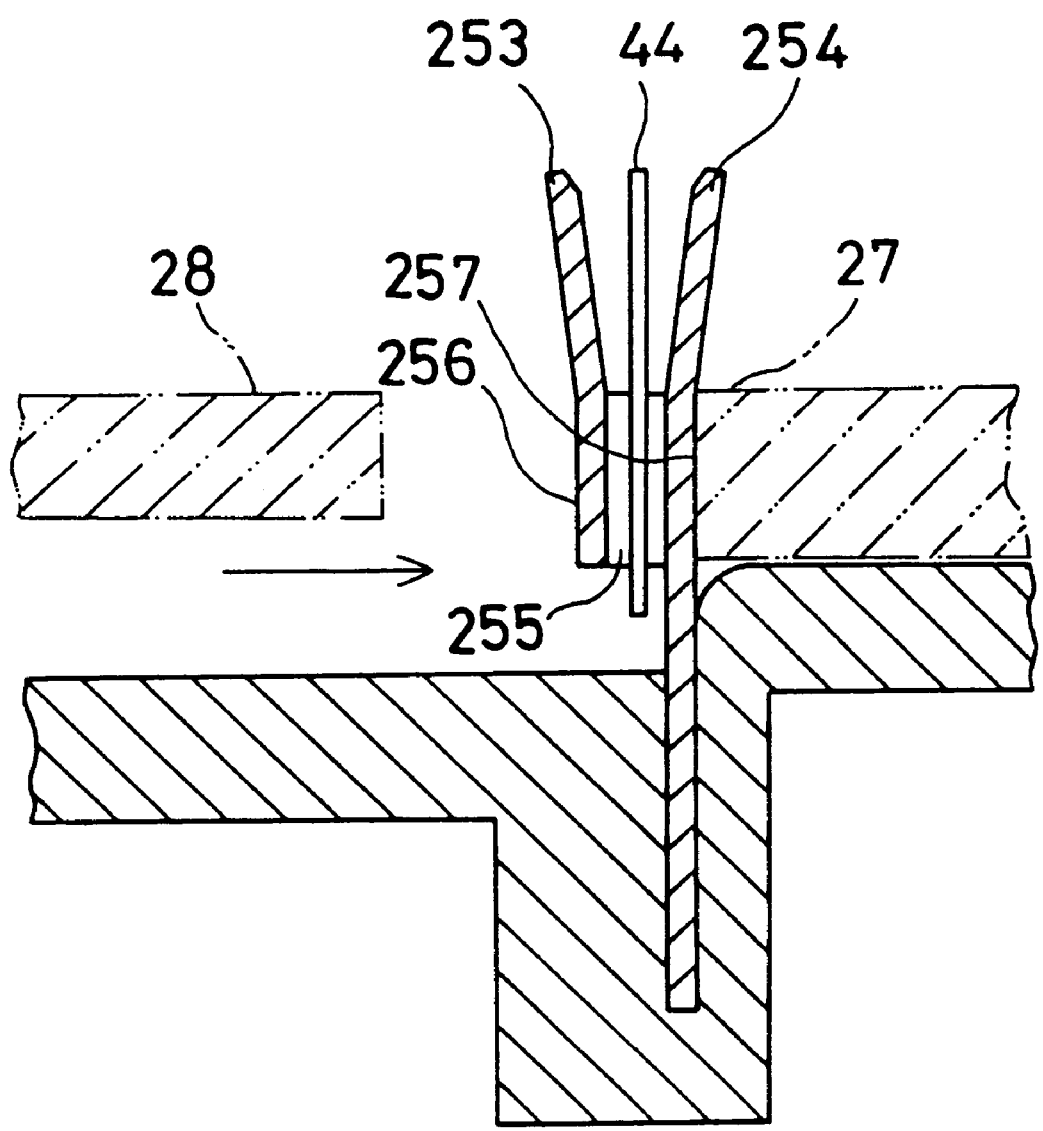
FIG. 7 is a cross-sectional view of the part illustrated in FIG. 5 cut along a line VII—VII.

Each of the catch members 251 has a V-shaped member composed of a pair of tongue plates 253 and 254 which are formed on a U-shaped plate, a groove 255 formed therebetween (as shown in FIG. 5 through FIG. 7), a flat surface 256 for receiving a punch 28 and a flat surface 257 for receiving a punch pad 27 as shown in FIG. 5.

Each of the metal terminals 6 is made of phosphor bronze plated with tin and has an embossed contact portion 611 which has an arc-shaped cross section, a bent front plate 61, a rear plate 62 which has a rectangular resilient tongue 621 and a side plate 63 which extends to the front from the rear plate 62 as shown in FIG. 1 through FIGS. 4A and 4B.

Figure 3:
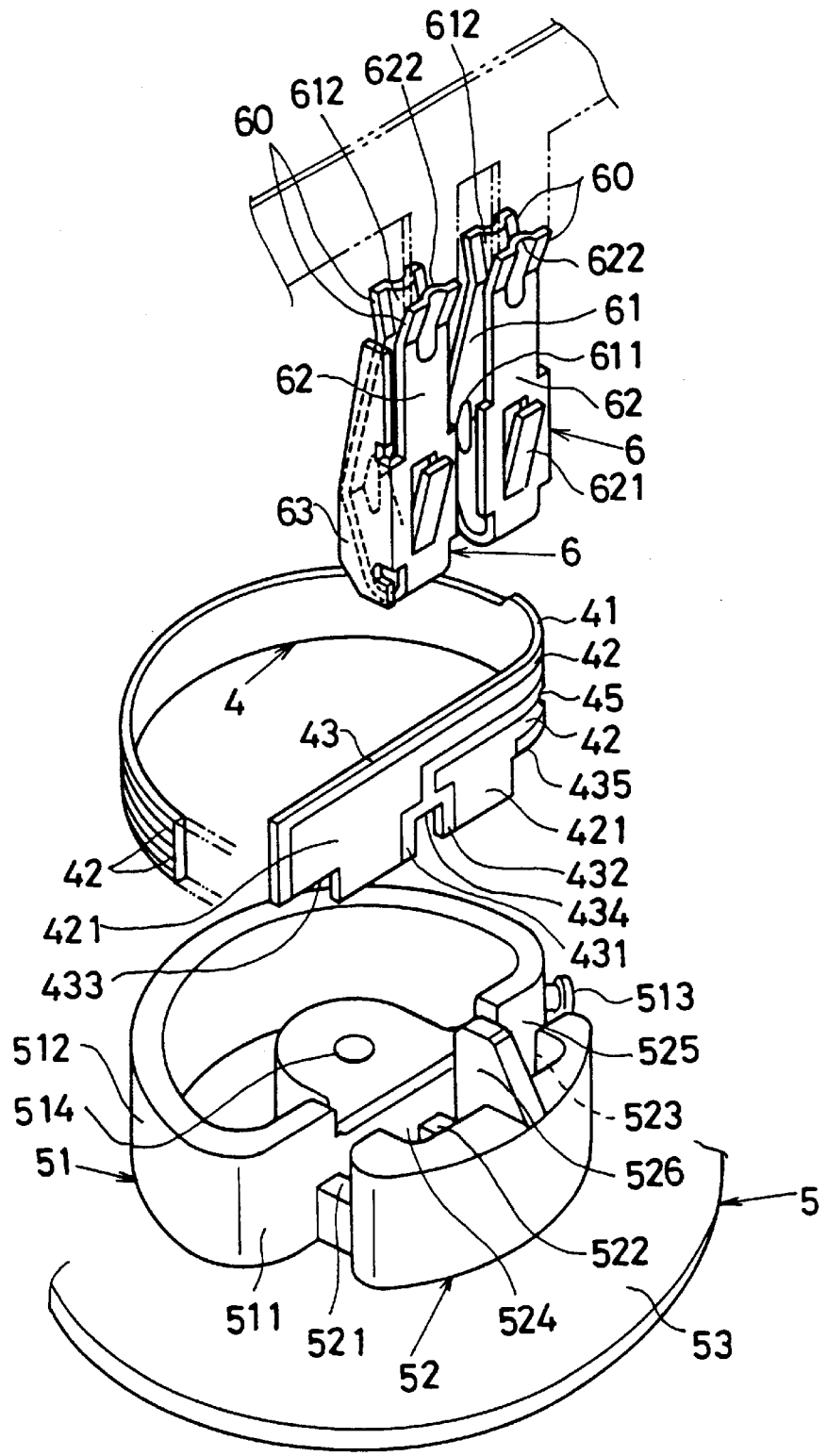
FIG. 3 is an exploded view illustrating an insulator of the indicating instrument according to the first embodiment.

Top ends 60 of the front and rear plates 61 and 62 are bent to form a clamp portion which has a V-shaped open ends with longitudinal reinforcement ribs 612 and 622 formed thereon as shown in FIG. 3.

Figure 2:
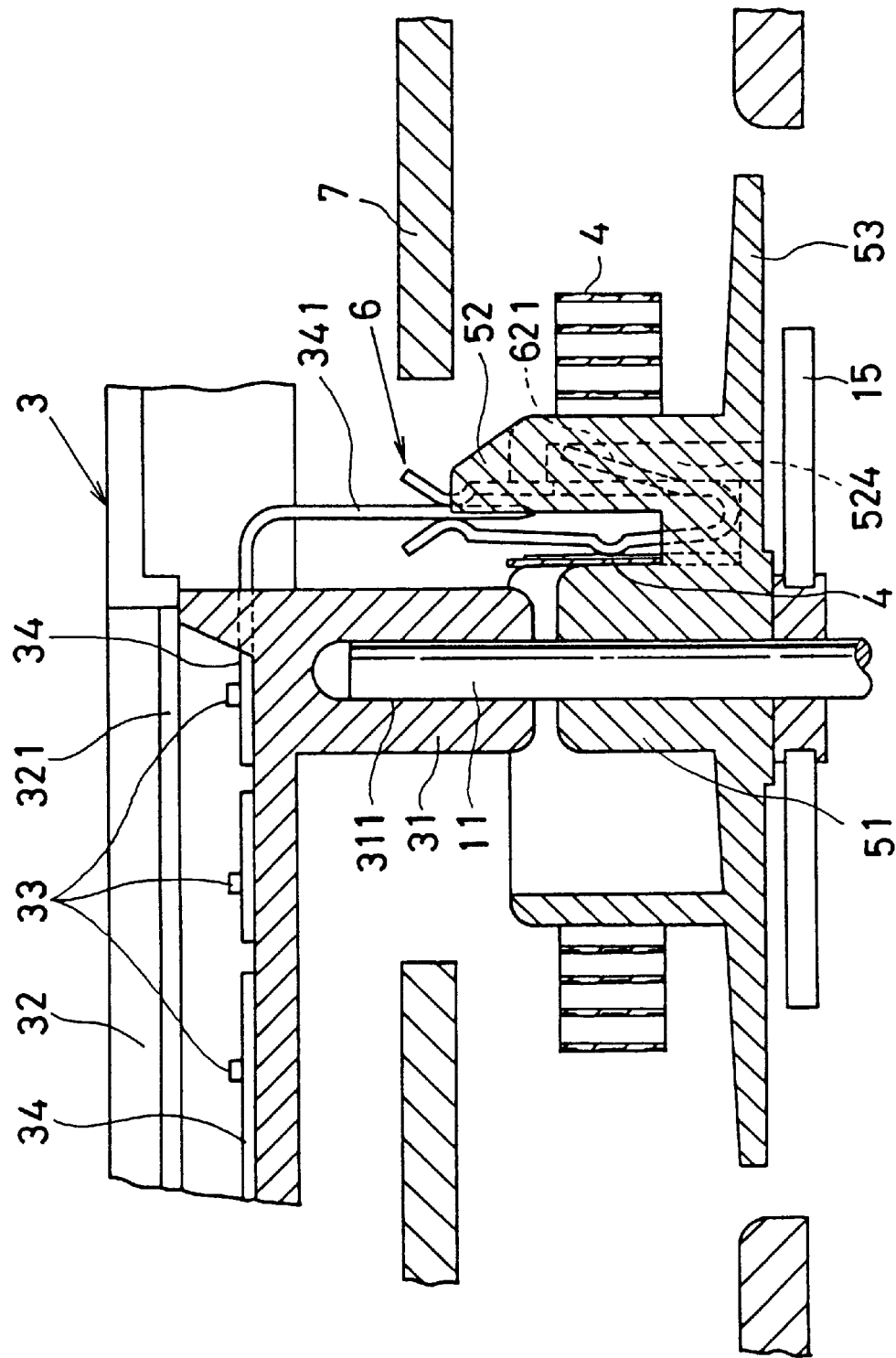
FIG. 2 is a cross-sectional side view of a main part of the indicating instrument according to the first embodiment.

A self-luminescent indicator 3 has a boss 31, a needle pointer 32 shown in FIG. 1, light emitting element including diode (hereinafter referred to as LED) chips 33 and lead frames 34 as shown in FIG. 2.

The boss 31 forms a column made of polycarbonate and has a hole 311 in which the shaft 11 of the movement 1 is fitted.

The pointer 32 which is made of polycarbonate extends perpendicularly from the boss 31 and has the lead frames 34 therein and an optical lens 321 thereon to increase the luminosity of the pointer. A plurality of the LED chips 33 are bonded and electrically connected to the lead frames 34.

The lead frames 34 are made of thin (0.2 mm thick) phosphor bronze plate and has an electric lead member in the form of an L-shaped plate or portion 341 extending from a rear portion of the pointer 32 and inserted in the metal terminals 6.

The lead frames 34 are plated with silver to ensure reliability of the bonding with the LED chips 33. The L-shaped portions 341 of the rear frames 34 are further plated with tin to protect the surface from forming silver sulfide which is not conductive.

FPC 4 is formed from a coiled polyimide film 41, on which copper foil 42 is printed, to have a coil spring characteristic. The FPC 4 has an inner straight end 43 and an outer straight end 44.

The outer straight end 44 has tongues or electric lead member in the form of 441 and 442 extending downward as shown in FIG. 1 to be connected to the fixer terminals 25, and the inner straight terminal 43 has tongues or electric lead member in the form of 431 and 432 extending downward to be connected to the metal terminals 6.

An insulating coat of polyimide covers on the copper foil 42 of the FPC 4 except for the straight ends 43 and 44.

Figure 4A:
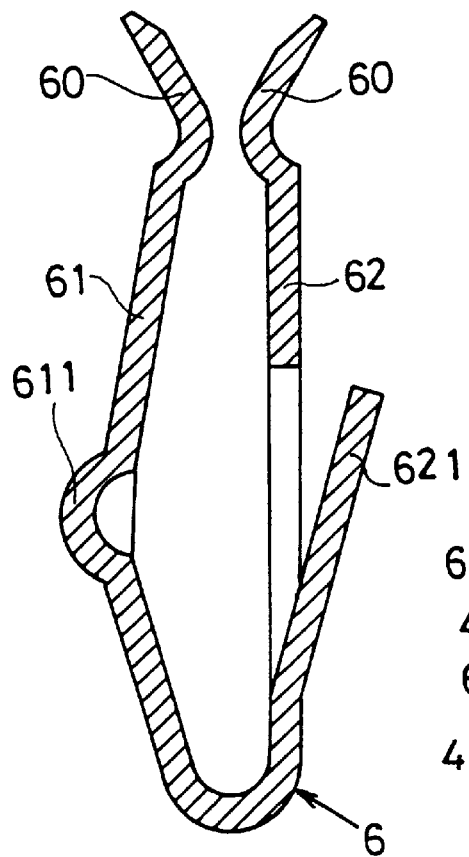
FIG. 4A is a cross-sectional side view illustrating a metal terminal before fixed to the insulator of the indicating instrument according to the first embodiment and FIG. 4B is the same after fixed to the insulator.
Figure 4B:
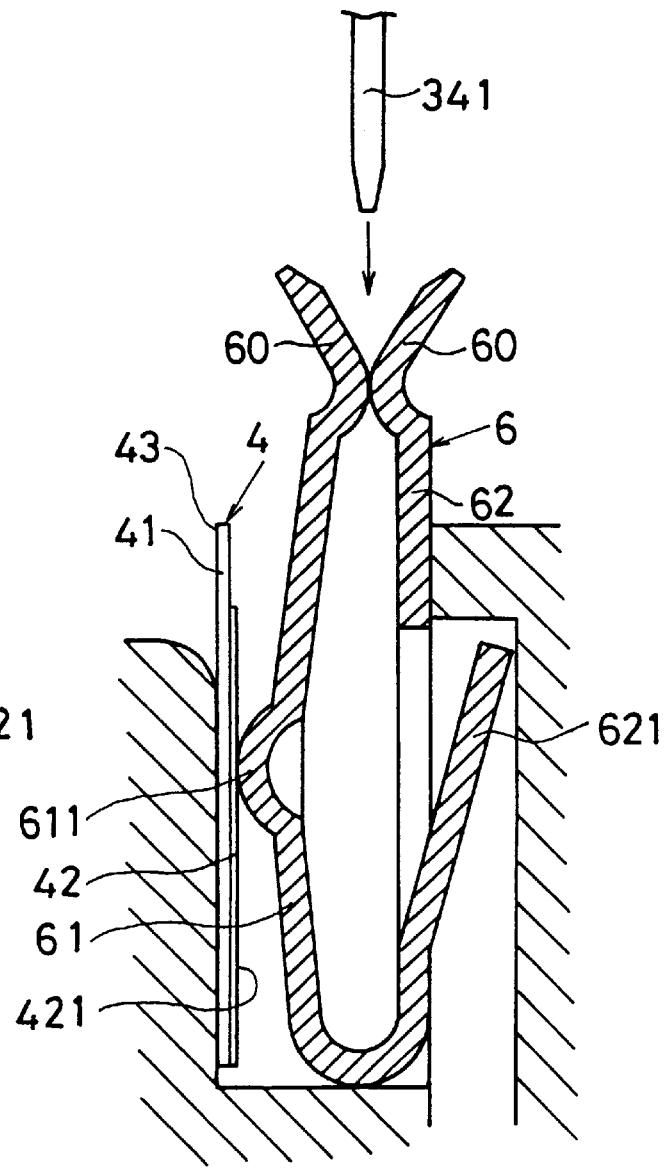

The copper foil 42 of the inner straight end 43 is plated with copper 421 as shown in FIG. 4B.

The copper foil 42 of the outer straight end 44 is plated with copper first and with solder thereafter to prevent the copper surface from forming copper oxide which is non-conductive. The tin plating is also effective to forming the diffused layer in the thermo-compression bonding as described later.

The insulator 5 is made of polyacetal and has a FPC guide portion 51, fixture portion 52 which holds the inner straight end 43 of the FPC 4 and a disk member 53, which is disposed at a designated distance from the hair spring 15.

The disk member 53 restrains vibration of the hair spring 15 thereby preventing generation of noise.

The FPC guide 51 rises from the disk member 53 and has a flat back surface 511, arc-shaped guide surface 512, a pin 513 and a center hole 514 through which the shaft 11 extends. The fixture portion 52 is formed on the flat back surface 511 of the FPC guide 51 and has beams 521, 522 and 523 on which the straight inner end 43 of the FPC are laid, slots 524 and 525 in which the tongues 431 and 432 are fitted and a partition member 526.

Now, assembling steps of the FPC 4 and the metal terminals 6 to the insulator 5 will be described with reference to FIG. 1 through FIG. 5. FIG. 3 illustrates the FPC before it is assembled and FIGS. 1,2 and 5 illustrate the same after it is assembled. FIG. 1, FIG. 3, and FIG. 4A illustrate the metal terminals 6 before it is assembled and FIG. 2, FIG. 4b and FIG. 5 illustrate the same after it is assembled.

The inner straight end 43 of the FPC 4 is fitted to the fixture portion 52 of the insulator 5 in FIG. 3. The height of the FPC 4 is fixed by bottom surfaces 433, 434 and 435 of the straight end 43 and by upper surfaces of the beams 521, 522 and 523. The longitudinal position of the FPC 4 is fixed by the tongues 431 and 432 of the FPC 4 and the slots 524 and 525. Then, an elliptic opening 45 formed between the straight end 43 and the arc-shaped portion of the FPC 4 is fitted to the pin 513. The inner straight end 43 of the FPC 4 is pressed from the back toward the shaft 11 by a tool (not shown) which is removed after the metal terminals 6 are assembled.

The terminals 6 are coupled by a member to have the same interval as the slots 524 and 525 of the insulator 5 as shown by chain lines in FIG. 3 and fitted in the slots 524 and 525. The member is removed thereafter.

When the metal terminals 6 are inserted in the slots 524 and 525, the front portions 61 are bent so that the embossed contact portion 611 press surfaces of the inner straight end 43 which are plated with copper.

The tongues 621 of the terminals 6 retain the terminals in the slots 524 and 525 as shown in FIG. 2. The side plates 63 and the rear plates 62 prevent rattling of the terminals 6.

When the speedometer J is assembled, the fixer plate 2 is first secured to the movement 1 by inserting screws 26 into the screw holes 121 of the movement 1 via the through holes 221 of the fixer 2. Then, the insulator 5 is pressed on the fixer plate 2 so that the shaft 11 is press-fitted into the center hole 514. In this step, an amount of electric current corresponding to a speed, e.g. 40 km/h, is supplied to the coils of the movement 1 and the metal terminals 6 are disposed at a place opposite (at an angle 180° from ) the speed indication '40' on the dial plate 7, that is, the rear side of the indicator 3.

After the inner straight end 43, the metal terminals 6 and the insulator 5 are assembled as described before, the outer straight end 44 and the fixer terminals 25 are connected by thermo-compression bonding, which will be described later.

Next, the dial plate 7 is secured to the fixer plate 2 by screws 16, which are inserted into screw holes 711 of bosses 71 formed on the back of the dial plate 7.

Then, the shaft 11 is press-fitted to the center hole 311 of the boss 31 of the indicator 3 as shown in FIG. 2, and the L-shaped terminal 341 is inserted into the terminals 6 at the same time. When the shaft 11 is fitted into the center hole 311, an amount of electric current, e.g. an amount corresponding to 40 km/h, is supplied and the shaft 11 is adjusted so that the pointer 32 indicates an indication, e.g. 40 km, on the dial plate 7.

Before the terminal 6 is inserted into the insulator 5, the clamp portion formed by the ends 60 of the terminal 6 opens as shown in FIG. 4A. When the terminal 6 is inserted into the insulator 5, the clamp portion closes as shown in FIG. 4B. Since the L-shaped terminal 341 is inserted into the closed clamp portion, the front plate 61 of the terminal 6 deforms further, and the embossed portion 611 presses the inner straight end 43 at a high pressure.

The outer straight end 44 of the FPC 4 is connected to the fixer terminals 25 as described with reference to FIG. 5 and FIG. 6 below.

After the shaft 11 is inserted into the insulator 5 and the metal terminals 6 and the inner straight end 43 are assembled, the insulator 5 is adjusted so that the outer straight end 44 of the FPC comes to a bottom portion of FIG. 5. The tongue 442 is inserted into the groove 255 of the fixer plate 2 as illustrated in FIG. 6. Then, the straight end 44 is bent perpendicularly as indicated by an arrow 40 and the tongue 441 is inserted into the groove 255 of the fixer terminal 25.

Then, the punch pad 27 is placed so that both end and side surfaces thereof are in contact with the pad receiving surfaces 257 of the fixer terminals 25, and both punch receiving surfaces 256 are punched by hot punches 28 to form the thermo-compression bonding by melted tin or solder between the tongues 441 and 442 and the respective fixer terminals 25 where tin or solder is coated as illustrated in FIG. 7.

Figure 8:
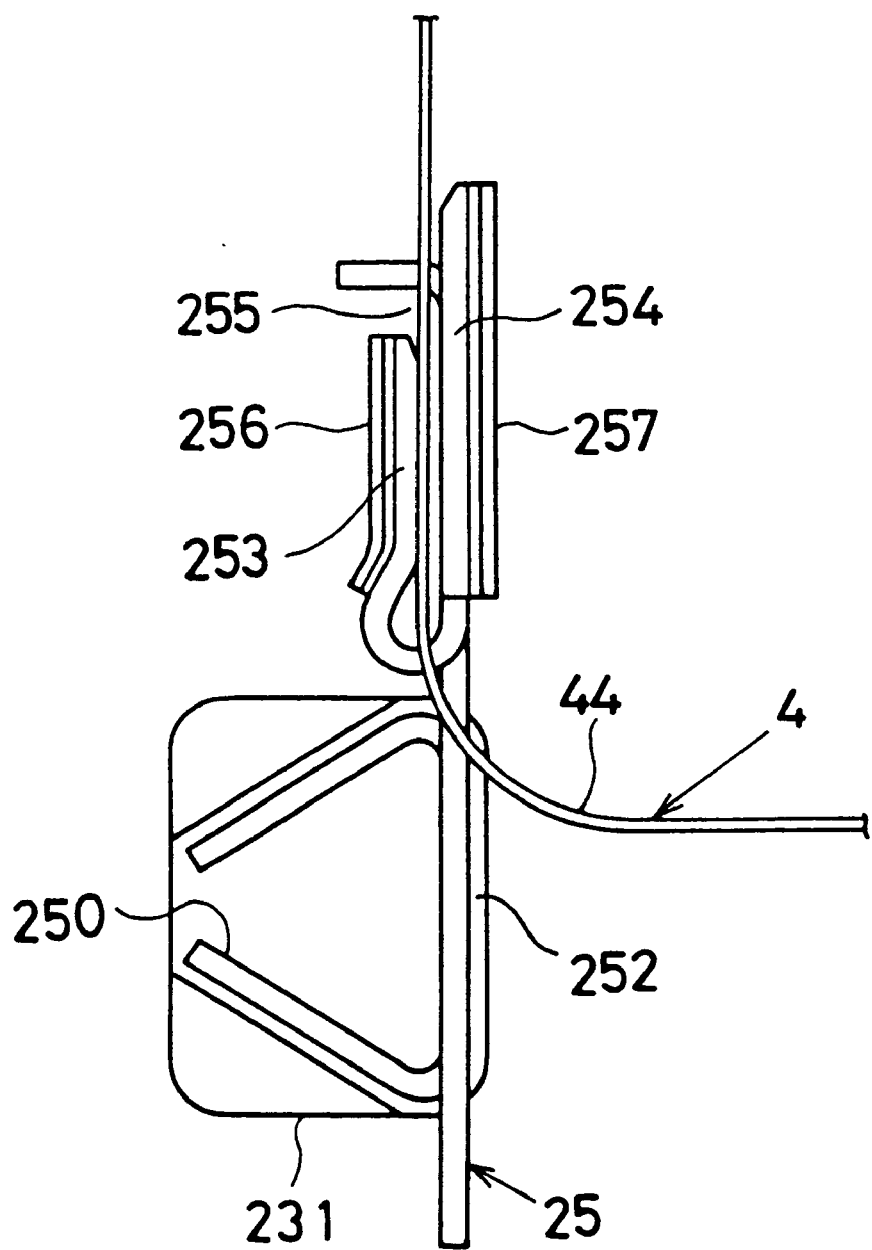
FIG. 8 is a schematic side view illustrating an outer end of the FPC and a fixer terminal after assembled.

Since the copper foil 42 of the FPC 4 is thin, it does not deform due to the punching. The base film 41 does not deform either. When the back of the punch receiving surface 256 springs back after receiving the punch, the FPC 4 leaves the back of the pad receiving surface 257 since only the base film 41 of the FPC 4 is in contact with the back of the surface 257. As a result, the FPC 4 is bonded solely to the back of the punch receiving portion 256 as shown in FIG. 8.

Next, the thermo-compression bonding between the outer straight end 44 of the FPC 4 and the fixer terminal 25 will be discussed with reference to FIGS. 9A, 9B and 9C.

The base film 41 of the straight end 44 is printed with copper foil 42 and the solder plating 422 is formed on the copper foil 42. Copper foil other than the foil on the straight end 44 are covered by insulating material as described before.

Figure 9C:
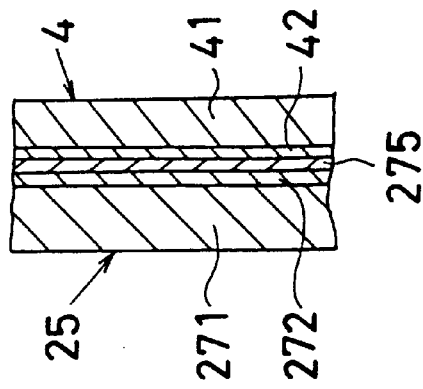
FIG. 9C is the same after diffusion bonding.
Figure 9B:
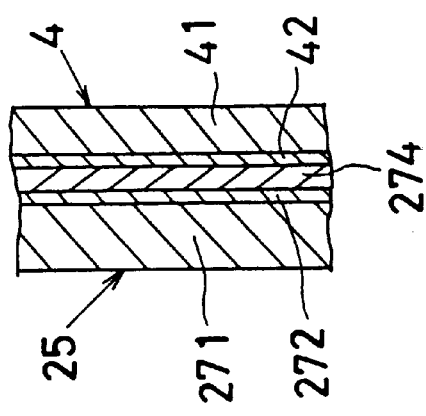
FIG. 9B is the same after solder bonding.
Figure 9A:
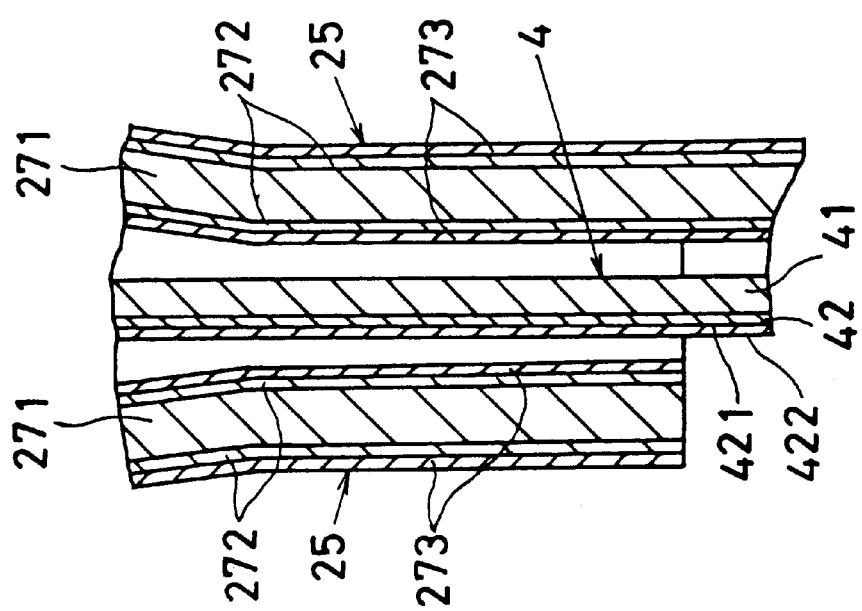
FIG. 9A is an enlarged view of a main portion of the part illustrated in FIG. 7 before bonding.

The fixer terminals 25 made of phosphor bronze are plated with copper 272 as the substratum plating 272 and is plated further with tin 273 as shown in FIG. 9A and described before.

When the fixer terminals are punched on the punch pad 27 as shown in FIG. 5 and heated, the solder 422 and the tin 273 melt and form a layer 274 between the copper foil 42 and the copper plating 272 as shown in FIG. 9B. The heating temperature is controlled so that copper of the copper foil 42 of the FPC diffuses into the solder plated film 422 and copper of the copper plating 272 diffuses into the tin plating 273. As a result, the copper which diffuses from the copper foil 42 and the copper plating 272, the tin plating 273 and the solder plating 422 form a metal alloy or a diffused layer.

Since ingredient which does not form the alloy is discharged by the punching, only copper of the copper foil 42 of the FPC 4 and of the copper plating 272 of the fixer terminals 25 exists on both sides of the diffused layer 275 as shown in FIG. 9C.

Since the diffused layer has high mechanical strength, the FPC 4 and the fixer terminals 25 are bonded firm and good electrical connection therebetween is ensured.

Figures 10A, 10B:
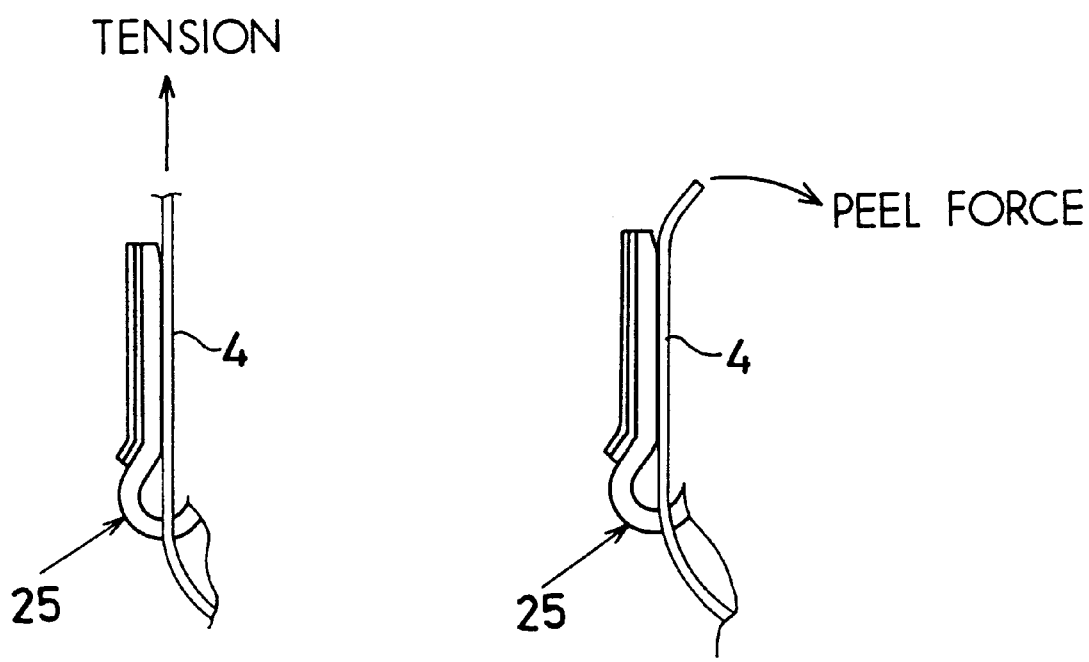
FIG. 10A and FIG. 10B are schematic views illustrating relationship between a fixer plate and the FPC when the indicator rotates.
Figure 11:
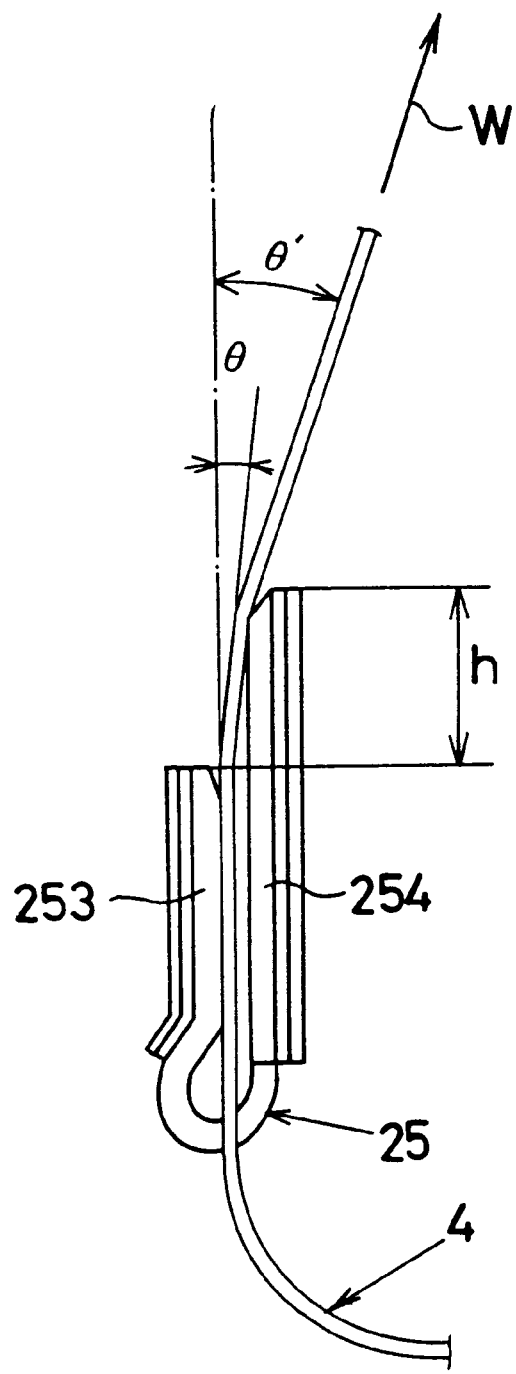
FIG. 11 is a schematic view illustrating relationship between the fixer plate and the FPC.

Next, bonding strength of the FPC 4 and the fixer terminal 25 will be discussed with reference to FIG. 10A and FIG. 10B. The peel strength of the FPC 4 to resist peeling off the fixer terminal 25 illustrated in FIG. 10B is generally ⅓ to ⅕ of the tension strength thereof illustrated in FIG. 10A. The higher vehicle speed the indicator 3 indicates (i.e. the more the coiled FPC 4 is wound up), the greater the angle θ' between the bonding surface and the FPC 4 becomes as shown in FIG. 11. Since the inner tongue 254 is formed by a length h longer than the other tongue 253 to support the FPC 4, the peeling angle is limited to an angle θ which is smaller than the angle θ'.

Therefore, if the tension is the same, peeling resistance is increased.

The device according to the first embodiment of the present invention provides the following advantages.

a) Since the metal terminals 6 are used, the indicator 3 and the FPC 4 can be separately assembled so that the indicator 3 and the FPC 4 or other parts will not deform before assembling, reducing production cost and troubles.

b) Since the FPC 4 can be put to the insulator before the dial plate 4 is assembled and the tongues 441 and 442 of the FPC 4 are inserted into the grooves 255 of the fixer terminals 25, the outer straight end 44 of the FPC 4 can be fixed to the fixer terminal 25 with ease.

c) Since the indicator 3 can be press-fitted to the shaft 11 after the dial plate is installed, there is no need of managing the indicator to pass through the opening of the dial plate.

d) Since the clamp portion is formed at the upper ends 60 of the terminal 6, the terminal 341 of the indicator 3 can be connected with ease, and strong retaining force can be obtained as described before.

e) Since the fixer terminal 25 (made of phosphor bronze 271) is plated with copper 272 as a substratum plating and with tin 273 (or solder) to protect the copper plating and the copper foil 42 of the FPC 4 is plated with copper 421 as a substratum plating and with solder 422 thereafter, the FPC 4 and the fixer plates 25 can be bonded by hot punching, which can be automated with ease. The hot punching can form a diffused layer between the fixer terminal 25 and the copper foil 42 of the FPC 4 and strong bonding strength can be obtained.

f) Since the inner tongue 254 of the fixer terminal 25 is formed longer than the outer tongue 253 by a designated length h, the peeling resistance of the FPC 4 increases.

An indicating instrument for a speedometer according to a second embodiment of the present invention will be described next with reference to FIG. 12. The same reference numerals in the figure indicate the same or equivalent parts or components and detailed description will be omitted. In the meantime, the above will be also applied to descriptions of other embodiments.

In this embodiment, only the thickness of the L-shaped terminal of the indicator 3 and the structure of the metal terminals 6 are different from the first embodiment.

The L-shaped terminal 341 of the indicator 3 has a thickness no less than 0.4 mm.

Each of the metal terminal 6 is made of phosphor bronze and has a rear plate 62, a side plate 63 (both are substantially the same as the first embodiment) and a front plate 61 which extends from the side plate 63 to face the rear plate 62 in substantially the same manner as the first embodiment (cf. FIG. 3).

Since the thickness (no less than 0.4 mm) provides high resilience, the clamp portion formed at the upper ends 60 can have an opening α to receive the L-shaped terminal easily without decreasing the retaining force of the terminal 6.

Figure 13C:
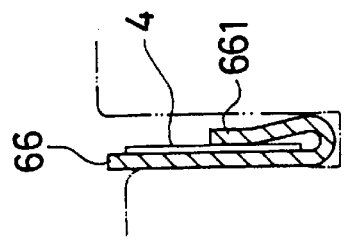
FIG. 13C is a cross-sectional side view illustrating a clamp portion of the metal terminal.

An indicating instrument according to a third embodiment will be described with reference to FIGS. 13A, 13B and 13C next.

The inner straight end 43 of the FPC 4, the metal terminals 6 and the insulator 5 of the first embodiment are modified in this embodiment.

Each of metal terminals 6 of the third embodiment has a front plate 65, a rear plate 62 and a clamp member 66 which extends parallelly from the front plate 65. The clamp member 66 has a U-shaped portion 661 which fastens the FPC 4.

A fixture portion 52 of this embodiment does not have the beams 521, 522 or 523 of the first embodiment, but has the slots 524 and 525 thereof.

Figure 13B:
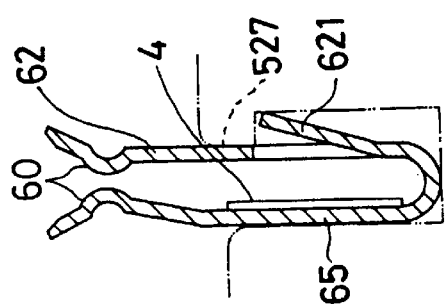
FIG. 13B is a cross-sectional side view of a main portion of the metal terminal.
Figure 13A:
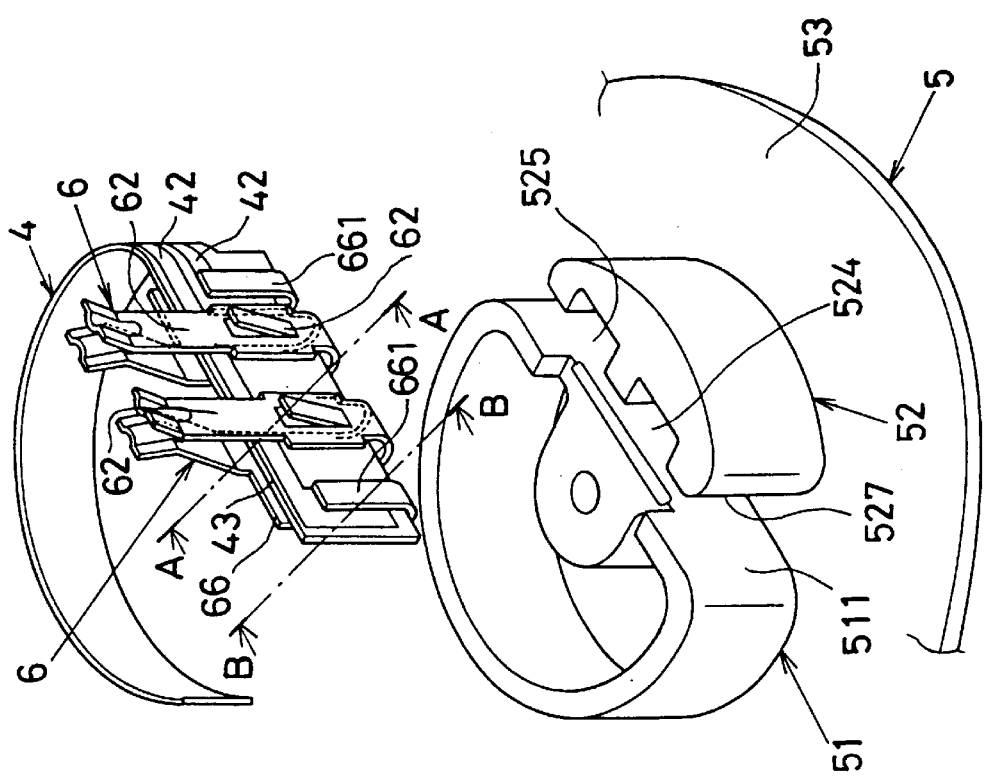
FIG. 13A is an exploded view illustrating the metal terminals holding an end of the FPC and the insulator according to a third embodiment before assembled.

The FPC 4 is disposed between the front plate 65 and the rear plate 62 as shown in FIG. 13B. The inner straight end 43 of the FPC 4 does not have the tongues 431 or 432 of the first embodiment, but portions of the copper foil 42 of the FPC 4 fastened by the clamp member 66 are plated with solder.

When assembled, the FPC 4 is inserted between the front plate 65 and the rear plate 62 of the terminals 6, a punch pad (not shown) is placed on the front side (left in FIG. 13C) of the clamp members 66 and the U-shaped portions 661 are punched from the right in FIG. 13C so that thermocompression bonding layer is formed between the FPC 4 and the metal terminals 6. Then, the terminals 6 along with the FPC 4 are fitted to the insulator 5 as shown in FIG. 13B and FIG. 13C.

In this embodiment, since thermo-compression bonding layers are formed by hot punching between the internal straight end 43 and the clamp members 66 as well as between the outer straight end 44 and the fixer terminals 25 (as in the first embodiment), reliable electric connection and high bonding strength can be provided.

Figure 14:
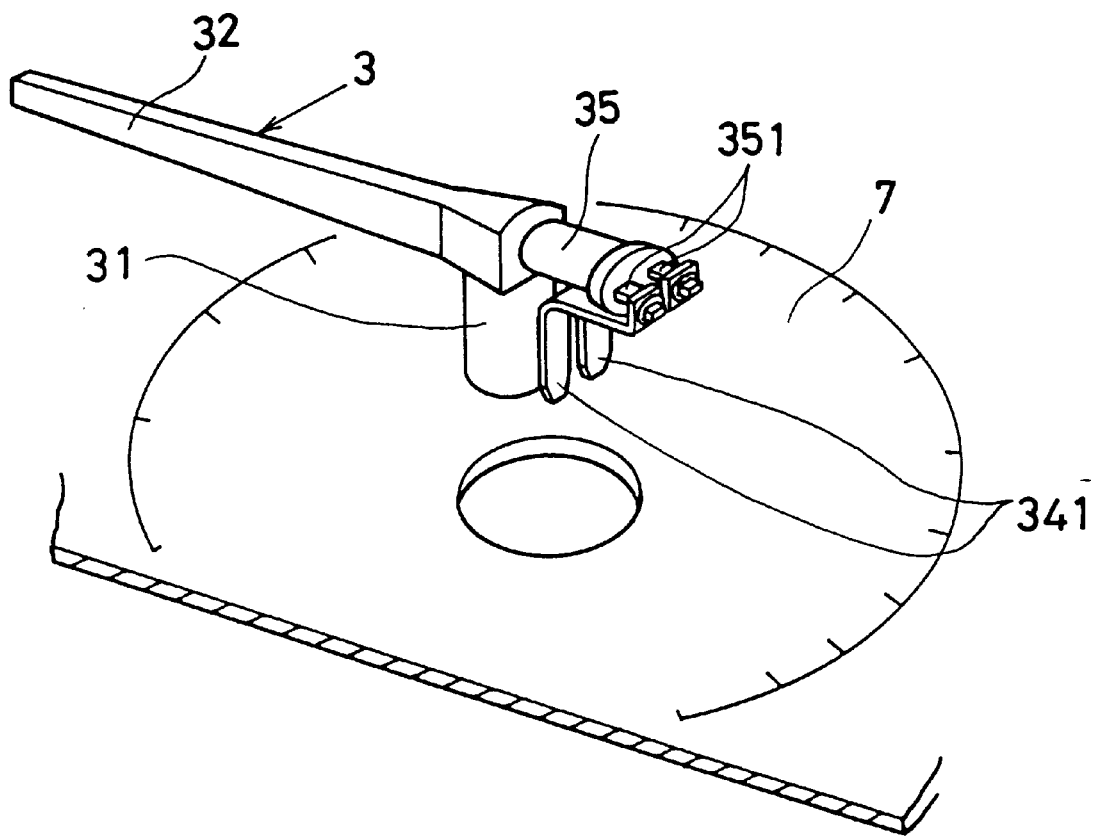
FIG. 14 is a perspective view illustrating a speedometer according to a fourth embodiment of the present invention.

A fourth embodiment will be described next with reference to FIG. 14.

A speedometer according to the fourth embodiment has an indicator 3 which is only different from the first embodiment. A pointer 32 is made of acrylic resin, polycarbonate or the like and has LED elements 35 at its back end. L-shaped terminals 341 are soldered to leads 351 of the LED elements 35.

Figure 15:
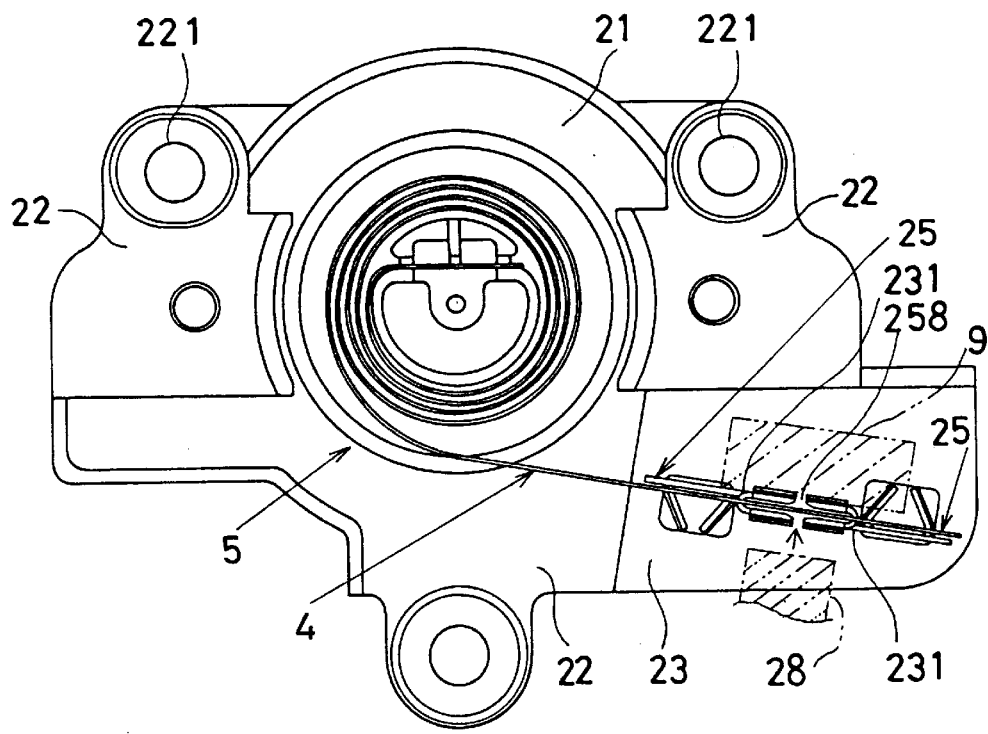
FIG. 15 is a plan view illustrating a main part of an indicating instrument according to a fifth embodiment.
Figure 16:
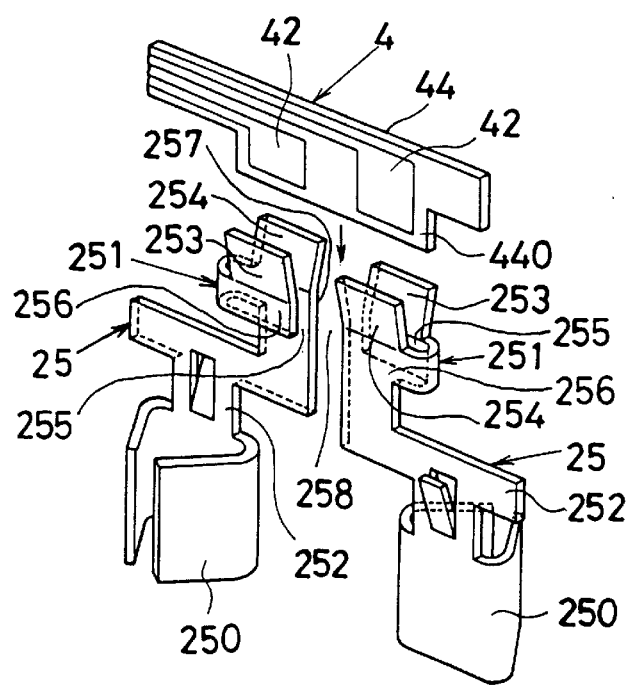
FIG. 16 is a perspective view illustrating an end of the FPC and fixer terminals of the indicating instrument according to the fifth embodiment before they are assembled.

A speedometer according to a fifth embodiment of the present invention will be described with reference to FIG. 15 and FIG. 16 next. In this embodiment, the insulator 5, the outer straight end 44 and the fixer terminals 25 of the first embodiment are changed.

The metal terminals 6 may be changed from those of the first embodiment to those of other embodiments.

The outer straight end 44 of the fifth embodiment has a single tongue 440 in which two patterns of copper foils 42 are formed and plated with solder. The copper foil located other portion is covered with insulating coating. Three movement support members 22 having through holes 221 are disposed respectively at outer peripheries of the cylindrical portion 21. Terminal portion 23 has two grooves 231 in alignment and is also disposed on a periphery of the cylindrical portion between two of the support members 22.

Each of the same shaped fixer terminals 25 has a catch member 251 and a tongue on a triangular pillar 250. They are inserted into the grooves 231 respectively to face opposite directions so that the grooves 255 are aligned to form a tongue receiving portion 258 as shown in FIG. 16. A reference numeral 256 indicates a punch receiving portion and a reference numeral 257 is a pad receiving surface as described with respect to the first embodiment.

Since the outer straight end 44 of the FPC 4 can be inserted into the fixer terminals without bending, assembling work and production cost can be reduced.

An indicating instrument used for a speedometer according to a sixth embodiment of the present invention will be described with reference to FIG. 17, FIG. 18 and FIG. 19 next.

In the speedometer, the insulator 5, the outer straight end 44 of the FPC 4 and the fixer terminals 25 of the first embodiment are modified.

The metal terminals 6 of the first embodiment can be replaced by another terminals used in other embodiments.

The outer end 44 of the FPC 4 of this embodiment is divided to two strips by a slit K as shown in FIG. 18. The respective strips have tongues 441 and 442, and inserted into respective fixer plate 25 which are disposed at both sides of a trapezoid on a terminal portion 23 as illustrated in FIG. 17 and FIG. 19. Each of catch members 251 of the fixer plates 25 has a V-shaped member composed of a pair of tongue plates 253 and 254 which are formed on a U-shaped plate, a groove 255 formed therebetween, a surface 256 for receiving a punch 28 and a surface 257 for receiving a punch pad 27 as shown in FIG. 17 and FIG. 19.

In this embodiment, location of the fixer terminal can be designed easily.

Figure 20:
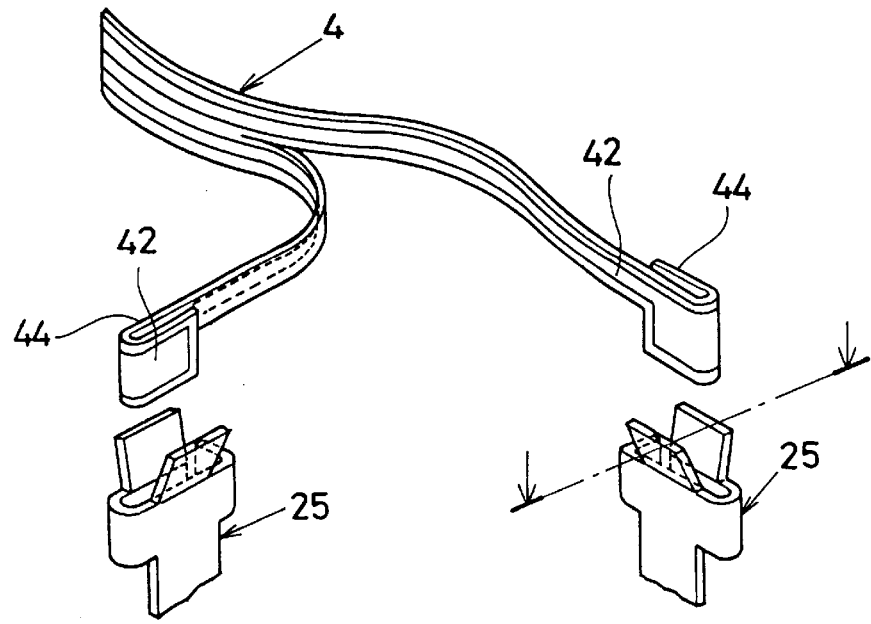
FIG. 20 is a perspective view illustrating end portions of the FPC and a portion of the fixer terminals of an indicating instrument according to a seventh embodiment.

A speedometer according to a seventh embodiment will be described with reference to FIGS. 20 and 21 next.

The outer straight end 44 of the FPC 4 and the fixer terminals 25 of the sixth embodiment are modified in this embodiment.

The outer straight end 44 of the FPC 4 of this embodiment is not provided with the tongue 441 or 442 of the sixth embodiment. The straight ends 44 are bent so that the copper foil 42 comes outside as shown in FIG. 20. The copper foil 42 is not plated with tin or solder and is covered with polyimide except the end portion 44. The fixer terminals 25 of this embodiment are not plated with tin or solder either.

Figure 21:
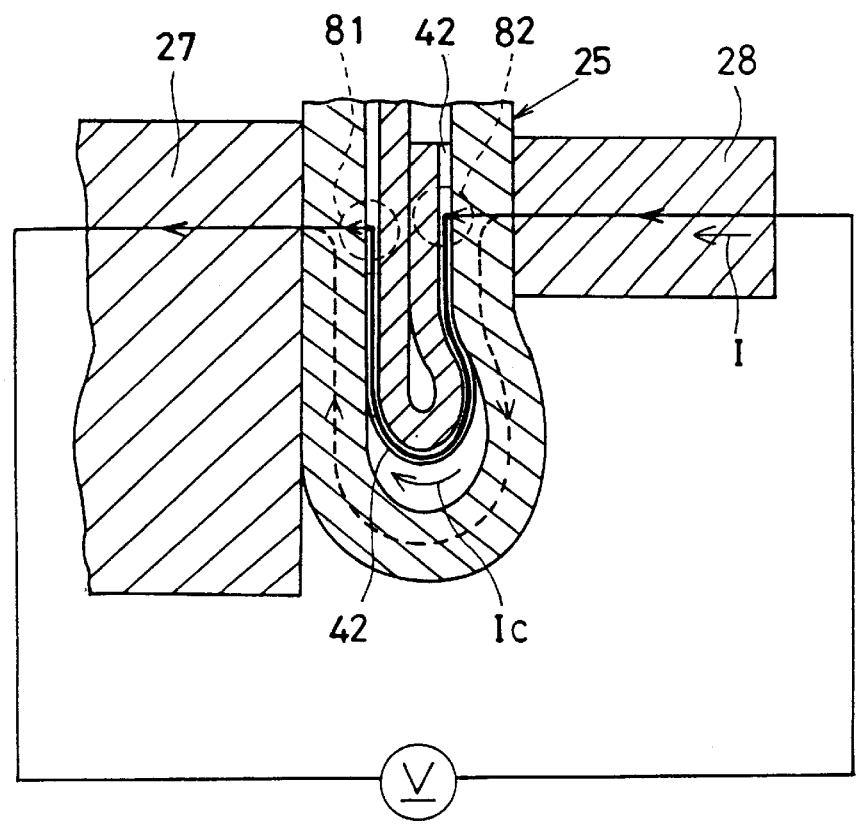
FIG. 21 is an enlarged cross-sectional side view illustrating a main portion of the fixer terminal of the indicating instrument according to the seventh embodiment.

The fixer plates 25 and the FPC 4 are bonded by a punch pad 27 and punch 28 as illustrated in FIG. 21. The punch 28 is connected to a plus terminal of a DC electric source (not shown) and the pad 27 is connected to a minus terminal of the electric source.

If the copper foil 42 of the end portion is covered with copper oxide or other nonconductive material, main electric current flows from the punch 28 through the fixer terminal 25 and the pad 27 as indicated by an arrow I and a broken line in FIG. 21. Electric current also flows through portions 81 and 82 of the fixer terminal 25 in contact with the copper foil 42 which is conductive and generates the joule heat, which breaks the copper oxide or other nonconductive material. The main current I then flows from the punch 28 through the fixer terminal 25, the contacting portion 82, the copper foil 42 (as indicated by an arrow Ic), the contacting portion 81, the fixer terminal 25, to the pad 27 since the copper foil 42 is more conductive than the fixer terminal 25 (which is made of phosphor bronze).

As a result, the copper foil 42 and the fixer terminal 25 in contact with each other melt and are bonded.

In this embodiment, no metal plating is required for the bonding and therefore the production cost can be reduced.

Figure 22A:
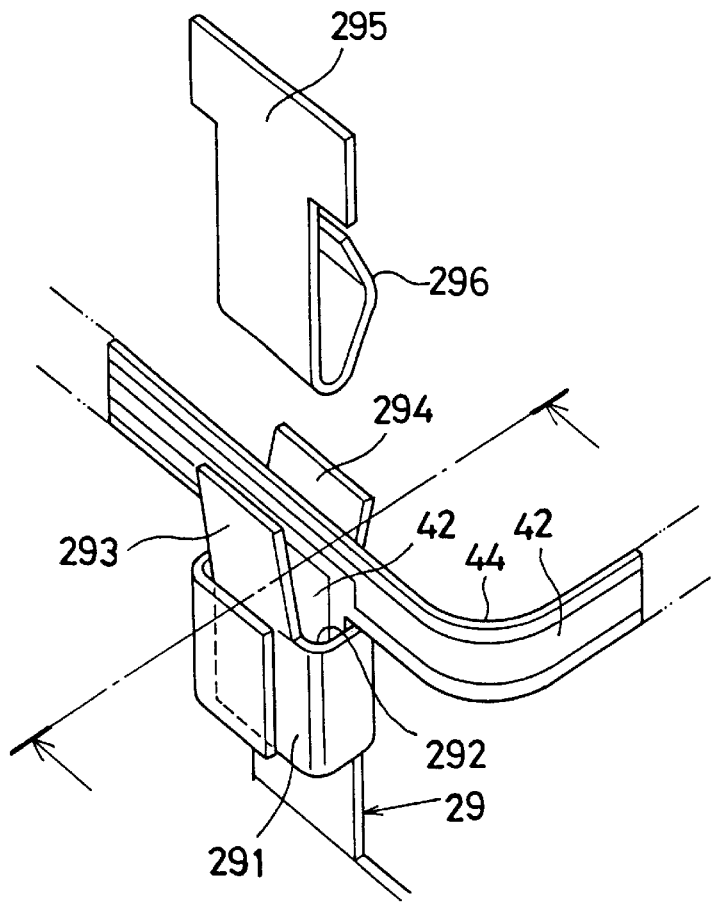
FIG. 22A is a perspective view illustrating a main portion of the fixer terminal and an end portion of the FPC of an indicating instrument according to an eighth embodiment and FIG. 22B is a cross-sectional side view illustrating a main portion of the fixer terminal of the above instrument.
Figure 22B:
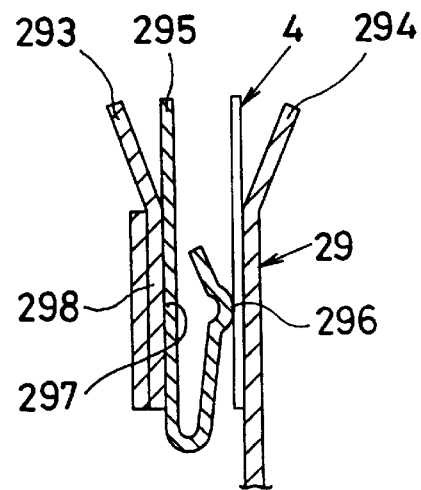

A speedometer according to a eighth embodiment will be described with reference to FIG. 13, FIG. 22A and FIG. 22B next.

The fixer terminal 25 of the third embodiment is modified for the eighth embodiment and other portions are the same as those of the third embodiment.

The inner straight end 43 is bonded by thermocompression bonding of the FPC 4 and the outer straight end 44 is clamped by a fixer terminal 29 in this embodiment.

The fixer terminal 29 has a clamp portion 291, a slot 292, tongues 293 and 294 which extend from the clamp portion 291 to form a V-shaped opening and a resilient wedge member 295 which is inserted into the slot 292. Electrical connection of FPC 4 and the fixer terminal 29 is made by the wedge. That is, the copper foil 42 of the FPC 4 is in contact with an edge portion 296 of the wedge member 295 and a wall of the wedge member 295 is in contact with an inner wall of the clamp portion 291.

In this embodiment, the electrical connection does not require soldering or punching.

Figure 23A:
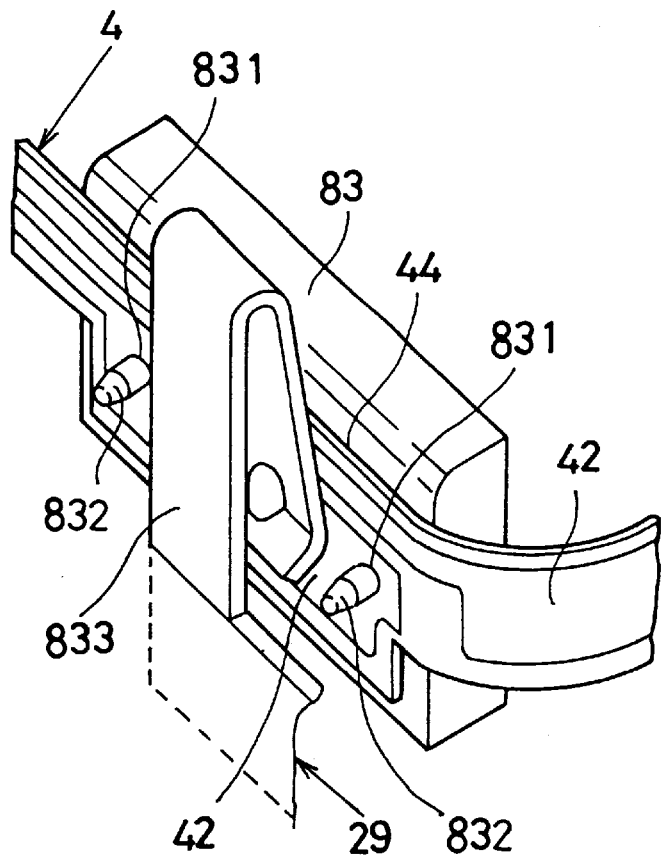
FIG. 23A is a perspective view illustrating a main portion of the fixer terminal of an indicating instrument according to a ninth embodiment of the present invention.
Figure 23B:
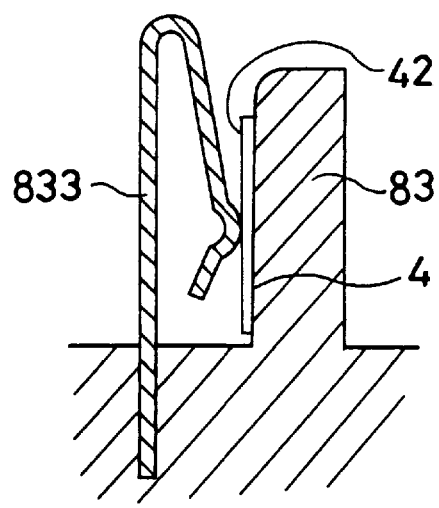
FIG. 23B is a cross-sectional view illustrating the above fixer terminal.

A speedometer according to a ninth embodiment will be described with reference to FIG. 13 and FIG. 23A and FIG. 23B next.

Only the fixer terminal 25 of the third embodiment is modified in this embodiment. A wall member 83 is formed on the terminal portion 23. The wall member 83 has through holes 831 in its longitudinal direction. Pins 832 are press-fitted into the through holes 831 to secure the FPC 4 thereto as shown in FIG. 23A. The copper foil 42 of the FPC 4 is biased by a wedge-shaped clamp 833 to establish electrical connection of the FPC 4 and the fixer terminal 29.

The above structure can reduce the assembling work.

Figure 24:
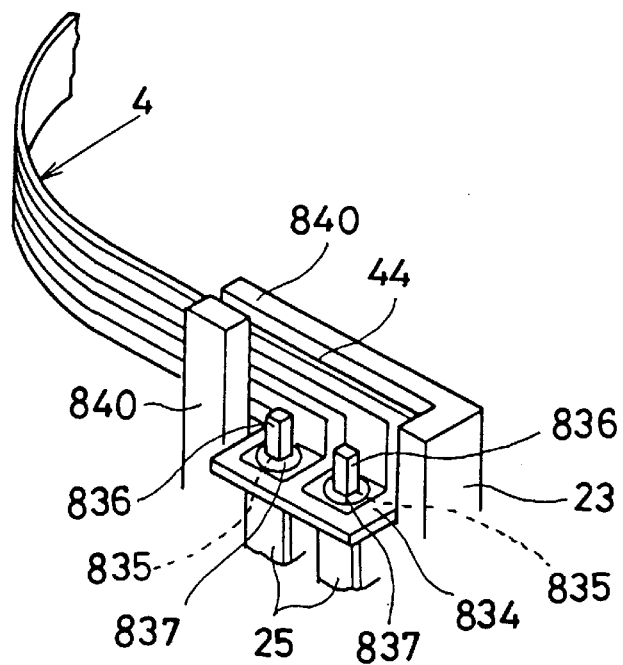
FIG. 24 is a perspective view illustrating a main portion of the fixer terminal and an end of the FPC of an indicating instrument according to a tenth embodiment of the present invention.

A speedometer according to a tenth embodiment will be described with reference to FIG. 15, FIG. 16 and FIG. 24 next.

The outer straight end 44 of the FPC 4, the terminal portion 23 and the fixer terminal 25 of the fourth embodiment are modified in this embodiment and other portions are the same.

The outer end 44 of the FPC 4 of this embodiment has two L-shaped terminal members 834 which have openings 835 respectively. The openings 835 of the L-shaped terminal members 834 are fitted to pins 836 of the fixer plates 25 and soldered to the same as indicated by a reference numeral 837 in FIG. 24. A reference numeral 840 indicates a guide member formed on the terminal portion 23 to support the FPC 4 in place.

The above structure is easy to assemble and effective to reduce the assembling time.

Figure 25:
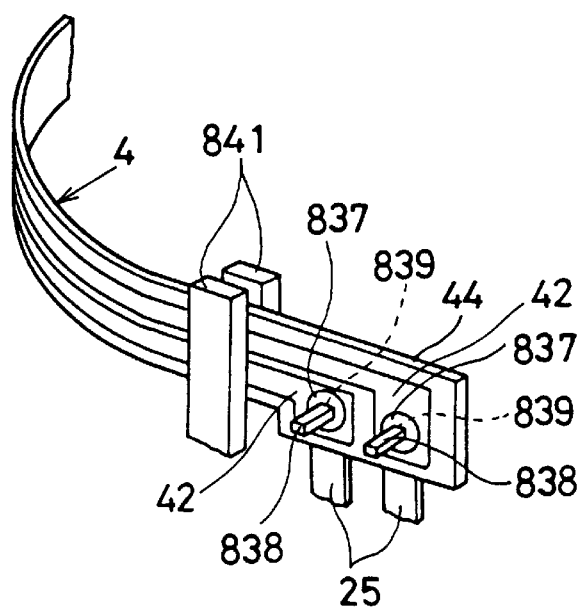
FIG. 25 is a perspective view illustrating a main portion of the fixer terminal and an end of the FPC of an indicating instrument according to an eleventh embodiment of the present invention.

A speedometer according to an eleventh embodiment will be described with reference to FIG. 15, FIG. 16 and FIG. 25 next.

The outer straight end 44 of the FPC 4, the terminal portion 23 and the fixer terminal 25 of the fourth embodiment are modified in this embodiment and other portions are the same.

The fixer terminals 25 of this embodiment have L-shaped ends or pins 838, which are inserted into openings 839 formed at the outer straight end 44 and soldered to the copper foil 42 around the openings 839 as indicated by a reference numeral 837.

The above structure is also easy to assemble and effective to reduce the assembling time.

A speedometer according to a twelfth embodiment will be described with reference to FIG. 1 through FIG. 9 and FIG. 26 next.

The fixer terminal 25 of the first embodiment is modified in this embodiment and other portions are the same.

Figure 26:
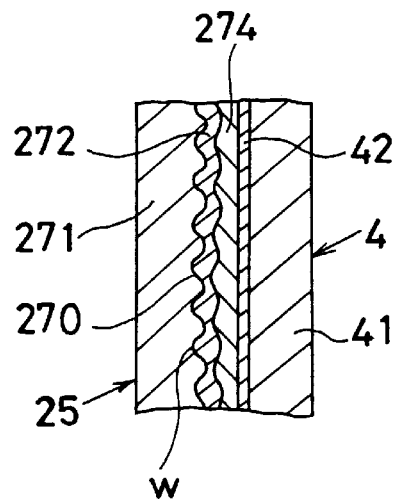
FIG. 26 is a cross-sectional side view illustrating a main portion of the fixer terminal and an end of the FPC of an indicating instrument according to a twelfth embodiment of the present invention.
Figure 27:
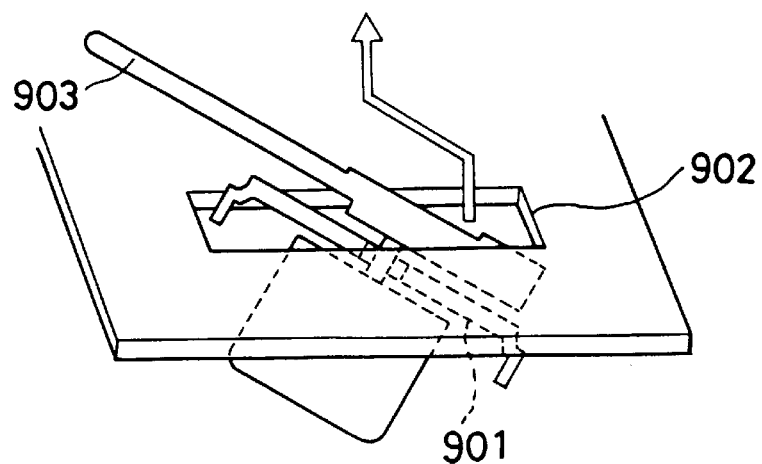
FIG. 27 is a schematic view illustrating an indicator and a dial plate of a conventional indicating instrument in an assembling step.

Inner surface 270 of the fixer terminal 25 (which is made of phosphor bronze 271) of this embodiment is etched to form a rough surface w as shown in FIG. 26. As a result, even if the surface is covered with copper oxide, it is destroyed by the edges of the rough surface and bonding strength can be always ensured. The etched surface w is also effective to increase the bonding strength when the fixer terminal 25 and the FPC 4 are bonded by soldering instead of punching.

A speedometer according to a thirteenth embodiment will be described with reference to FIG. 1 through FIG. 9 next.

Metal (tin, silver or solder) plating of the first embodiment is replaced by antitrust agent in order to prevent the oxidization. Since the antitrust agent scatters when the fixer terminal 25 is heated or punched, no trouble is expected.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. An indicating instrument comprising:
    a self-luminescent indicator carrying a light emitting element and a pair of first electric leads extending outside from said light emitting element;
    a rotary shaft;
    a movement unit driving said rotary shaft;
    a coiled circuit member disposed around said shaft, said coiled circuit member having a pair of second electric leads extending from one end thereof;
    a pair of U-shaped terminal members each having a respective clamp portion at one end thereof clamping a respective one of said first electric leads and having a respective bent portion at the other end;
    an insulator member carried by said rotary shaft, said insulator member having a pair of slot portions into which a respective said bent portion is compressingly inserted with a respective one of said second pair of electric leads, thereby connecting said first and second pairs of electric leads, and
    a fixer plate member fixing said movement unit and said insulator member, wherein
    said coiled circuit member has a pair of third leads at the other end thereof, and
    said fixer plate member has a pair of fixer terminal members for holding a respective one of said third electric leads.

2. An indicating instrument as claimed in claim 1, wherein said insulator member comprises a disk member, a guide portion for said coiled circuit member, and a fixture portion having said pair of slot portions.

3. An indicating instrument as claimed in claim 2, wherein said coiled circuit member has a straight end from which said second pair of electric leads extends, and
    said guide portion has a flat surface supporting said straight end of said coiled circuit member.

4. An indicating instrument as claimed in claim 1, wherein said first pair of electric leads comprises a pair of L-shaped plates clamped by said pair of clamp portions.

5. An indicating instrument as claimed in claim 4, wherein said pair of clamp portions of said terminal comprises a pair of V-shaped clamps respectively holding said pair of L-shaped plates.

6. An indicating instrument as claimed in claim 1, wherein each said terminal member comprises a respective resilient tongue member for retaining the respective terminal member in a respective one of said slot portions.

7. An indicating instrument as claimed in claim 1, wherein said fixer terminal members and said third electric leads are bonded together by thermo-compression bonding.

8. An indicating instrument claimed in claim 7, wherein each of said fixer terminal members comprises a respective catch member made of phosphor bronze.

9. An indicating instrument as claimed in claim 8, wherein each catch member has a flat punch receiving surface where hot punching is applied to form said thermo-compression bonding.

* * * * *